United States Patent
Parusel et al.

(10) Patent No.: US 9,442,237 B2
(45) Date of Patent: Sep. 13, 2016

(54) METHOD FOR PRODUCING LIGHT GUIDE BODIES AND USE THEREOF IN LIGHTING UNIT

(75) Inventors: Markus Parusel, Messel (DE);
Guenther Dickhaut, Mannheim (DE);
Thomas Pfaff, Hemsbach (DE);
Helmut Haering, Reinheim (DE);
Michael Enders, Dieburg (DE)

(73) Assignee: Evonik Roehm GmbH, Darmstadt (DE)

(*) Notice: Subject to any disclaimer, the term of this patent is extended or adjusted under 35 U.S.C. 154(b) by 410 days.

(21) Appl. No.: 13/993,882

(22) PCT Filed: Nov. 11, 2011

(86) PCT No.: PCT/EP2011/069893
§ 371 (c)(1),
(2), (4) Date: Aug. 8, 2013

(87) PCT Pub. No.: WO2012/079865
PCT Pub. Date: Jun. 21, 2012

(65) Prior Publication Data
US 2013/0343088 A1    Dec. 26, 2013

(30) Foreign Application Priority Data
Dec. 13, 2010   (DE) .......... 10 2010 062 900

(51) Int. Cl.
*B29D 11/00*   (2006.01)
*F21V 8/00*   (2006.01)
(Continued)

(52) U.S. Cl.
CPC ........... *G02B 6/0011* (2013.01); *B29C 47/004* (2013.01); *B29C 47/0021* (2013.01); *B29C 47/165* (2013.01); *B29D 11/00663* (2013.01); *G02B 6/0065* (2013.01); *B29C 47/0061* (2013.01); *B29K 2033/12* (2013.01);
(Continued)

(58) Field of Classification Search
CPC ............ B29C 47/0021; B29C 47/004; B29C 47/0061; B29C 47/165; B29D 11/00663; G02B 6/0011; G02B 6/0036; G02B 6/0065
See application file for complete search history.

(56) References Cited

U.S. PATENT DOCUMENTS 2,938,231 A    5/1960   Lowey et al.
3,408,694 A    11/1968  Matsuoka et al.
(Continued)

FOREIGN PATENT DOCUMENTS

BE    678967 A    10/1966
CN    1110944 A   11/1995
(Continued)

OTHER PUBLICATIONS

"Glattkalander und Chill-Roll Typ 136", Collin, Retrieved from the Internet: URL: www. drcollin.de/sendf.pPhp?=000017-0.p df, pp. 1-4, Total 12 Pages, Nov. 2001, XP002669871.
(Continued)

*Primary Examiner* — Mathieu Vargot
(74) *Attorney, Agent, or Firm* — Oblon, McClelland, Maier & Neustadt, L.L.P.

(57) ABSTRACT

The present invention relates to a method for producing light guide bodies and to their use in lighting units, for example for liquid crystal displays or for monitors.
In particular, the present invention relates to a method for producing light guide bodies which have a thickness of at most 1 mm and contain at least 80 wt % of polymethyl methacrylate and no light-scattering constituents.

10 Claims, 1 Drawing Sheet

Figure 1:
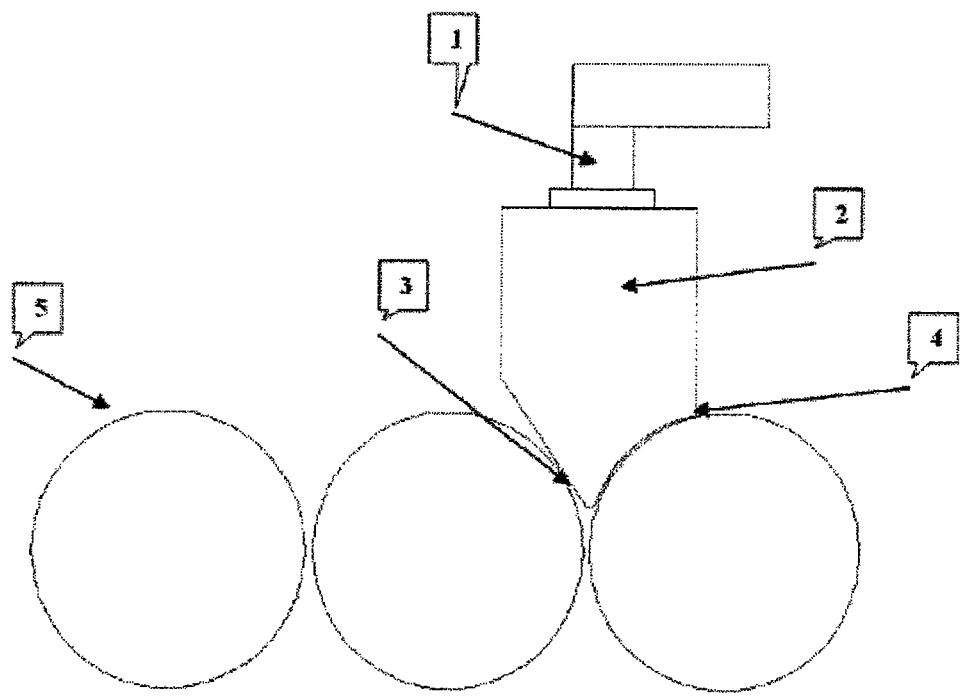

(51) Int. Cl.
*B29C 47/00* (2006.01)
*B29C 47/16* (2006.01)
*B29K 33/00* (2006.01)
*B29L 31/34* (2006.01)

(52) U.S. Cl.
CPC *B29K2995/0073* (2013.01); *B29L 2031/3475* (2013.01); *G02B 6/0036* (2013.01)

(56) References Cited

U.S. PATENT DOCUMENTS

| | | | |
|---|---|---|---|
| 4,226,904 | A | 10/1980 | Ollivier et al. |
| 4,354,814 | A | 10/1982 | Grimminger et al. |
| 4,863,361 | A * | 9/1989 | Boos .......... B29C 47/0019 264/176.1 |
| 5,167,894 | A | 12/1992 | Baumgarten et al. |
| 5,229,140 | A | 7/1993 | Crass et al. |
| 5,622,730 | A | 4/1997 | Nitta et al. |
| 5,779,962 | A | 7/1998 | Andraschko et al. |
| 7,046,903 | B2 | 5/2006 | Schmidt et al. |
| 8,092,731 | B2 | 1/2012 | Guenanten et al. |
| 2002/0041056 | A1 | 4/2002 | Nissel |
| 2004/0264159 | A1 | 12/2004 | Schmidt et al. |
| 2005/0084993 | A1 | 4/2005 | Schmidt et al. |
| 2005/0121831 | A1 | 6/2005 | Nissel |
| 2006/0121154 | A1 * | 6/2006 | Manning .......... B29C 45/1781 425/564 |
| 2006/0285351 | A1 | 12/2006 | Erber et al. |
| 2008/0159693 | A1 * | 7/2008 | Chang .......... G02B 6/0028 385/31 |
| 2012/0051696 | A2 | 3/2012 | Schmidt et al. |
| 2012/0067512 | A1 | 3/2012 | Schmidt et al. |

FOREIGN PATENT DOCUMENTS

| | | |
|---|---|---|
| CN | 1146946 A | 4/1997 |
| CN | 2642494 Y | 9/2004 |
| CN | 101203366 A | 6/2008 |
| CN | 101380820 A | 3/2009 |
| CN | 201494019 U | 6/2010 |
| DE | 15 04 266 | 6/1969 |
| DE | 10 2006 02548 | 12/2007 |
| EP | 0 198 556 | 10/1986 |
| EP | 0 367 022 A2 | 5/1990 |
| EP | 0 448 953 | 10/1991 |
| EP | 0 505 960 | 9/1992 |
| EP | 1 022 129 A2 | 7/2000 |
| EP | 1 117 731 B1 | 2/2003 |
| FR | 2 464 821 | 3/1981 |
| GB | 1 510 005 | 5/1978 |
| GB | 2 064 416 | 6/1981 |
| JP | 7-130208 | 5/1995 |
| JP | 2009-107180 A | 5/2009 |
| JP | 2010-91646 A | 4/2010 |
| KR | 10-2010-0000799 * | 1/2010 |
| WO | 97 36732 | 10/1997 |
| WO | WO 2006/046638 A1 | 5/2006 |
| WO | 2008 075811 | 6/2008 |

OTHER PUBLICATIONS

"Plexiglas and Europlex films Always on Top", Retrieved from the Internet: URL:http://www.plexiglas-shop.com/pdfs/en/films.pdf, [Retrieved on Jul. 10, 2012], (Aug. 2009), XP002679537.
International Search Report Issued Aug. 1, 2012 in PCT/EP11/69893 Filed Nov. 11, 2011.
Office Action issued Jul. 17, 2015 in Mexican Patent Application No. MX/a/2013/006672 (with English language translation).
Combined Chinese Office Action and Search Report issued Oct. 31, 2014 in Patent Application No. 201180065289.X (with English language translation).
H. Gross, et al., "Membran statt Staubalken", Kunststoffe 84 (1994) 10, S. 1352-1358.
Office Action issued May 18, 2015 in Mexican Patent Application No. MX/a/2013/006672 (submitting English translation only).
Combined Office Action and Search Report issued Apr. 21, 2015 in Chinese Patent Application No. 201180065289.X (with English language translation).
Office Action issued Apr. 28, 2014 in Japanese Patent Application No. 2013-543597 (submitting English translation only).
Office Action issued Mar. 30, 2015 in Korean Patent Application No. 10-2013-7018262 (with English translation).
U.S. Appl. No. 14/240,138, filed Feb. 21, 2014, Pisula, et al.
Office Action issued Dec. 9, 2013 in Japanese Patent Application No. 2013-543597 submitting English translation only.

* cited by examiner

METHOD FOR PRODUCING LIGHT GUIDE BODIES AND USE THEREOF IN LIGHTING UNIT

FIELD OF THE INVENTION

The present invention relates to a method for producing light guide bodies and to their use in lighting units, for example for liquid crystal displays or for monitors.

In particular, the present invention relates to a method for producing light guide bodies which have a thickness of at most 1 mm and contain at least 80 wt % of polymethyl methacrylate and no light-scattering constituents.

PRIOR ART

Light guide bodies are used in particular for the flat lighting of various electronic objects, for example liquid crystal displays (LCDs). Conventionally, light is input through an edge and output perpendicularly to the light propagation direction. EP 800 036 relates to such light guide bodies. In particular, the light is output by structuring which is provided in the surface of the plate.

Furthermore, EP 656 548 discloses light guide bodies which use polymer particles as scattering bodies. A problem with these light guide bodies is their weather resistance. In particular, intense UV exposure breaks down the polymer particles so that UV exposure leads to a yellow tinge. This yellow tinge is in turn highly critical for use as a light guide body, since a nonuniform colour impression is created.

Furthermore, EP 1 022 129 discloses light guide bodies which have a particle-free polymethyl methacrylate light-guiding layer, onto which a diffusely configured layer is applied. The diffusely configured layer, which has a thickness in the range of from 10 to 1500 µm, comprises barium sulphate particles. According to this principle, the light is guided via the PMMA layer, the output taking place through the diffuse layer. However, the output of light can scarcely be controlled since only the light which has passed through the interface with the diffusely configured layer is scattered perpendicularly to the propagation direction. This therefore involves diffuse back reflection rather than perturbation within the light-guiding layer. Furthermore, as confirmed by the examples, the decrease in the light intensity is very great.

Light guide bodies are furthermore described in DE-A 10 222 250. These light guide bodies have improved performance compared with the plates mentioned above. Their thickness, like the light guide bodies described above, is however at least 2 mm. For increasing miniaturization of electronic devices, and in particular for aesthetic reasons, a minimal thickness of the light guide body is however desirable. Reducing the plate thickness of the light guide bodies mentioned above leads to a very great decrease of the luminance in relation to the propagation direction of the light shone in. This leads to very inhomogeneous lighting, which is often unacceptable.

Object

In view of the prior art, it was therefore an object of the present invention to provide a method for producing thin light guide bodies, with which very homogeneous lighting of relatively large surfaces can be achieved.

It was another object of the invention for the light guide bodies to have particularly good yellowness indices and FWHM intensities even during prolonged use or after weathering.

It was furthermore an object of the present invention to provide lighting units, containing light guide bodies, which have a high energy efficiency, a high illumination strength and high reliability.

It was another object of the present invention to provide a simple and economical method for producing light bodies, the size and shape of which can straightforwardly be adapted to the requirements.

Solution

These and other objects, which are not explicitly mentioned but may readily be derived or inferred from the contexts discussed here in the introduction, are achieved by a new method for producing methacrylate-based light guide bodies. These light guide bodies according to the invention have a thickness of between 100 µm and 1 mm. The method is furthermore characterized in that it is an extrusion method with subsequent smoothing. The apparatus used for this purpose according to the invention consists at least of the following components: an extruder, a flat film nozzle having a nozzle lip, and a smoothing mechanism, in particular consisting of two smoothing rolls. In particular, the apparatus used according to the invention may also comprise the following optional components: a melt pump, melt filtration, a static mixing element and/or a winder.

In particular, the apparatus used in the method according to the invention is distinguished in that the flat film nozzle has a nozzle lip comprising control elements for adjusting the nozzle lip width, and the control elements have a mutual separation of from 5 to 20 mm, preferably from 11 to 15 mm. The gap of the nozzle lip can be finely adjusted over the entire width of the nozzle lip by means of the control elements. In this context, it is also referred to as a so-called flex lip or flex nozzle lip.

Figure 2:
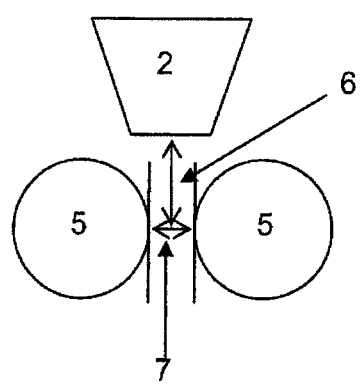

The nozzle body used in the method according to the invention has an external geometry which is adapted to the shape of the smoothing rolls (FIG. 1). This may involve triangular or trapezoidal convergence of the nozzle body towards the nozzle lip. In addition, the sides of the nozzle body may also be rounded so that they complementarily adopt the shape of the smoothing rolls. As represented by way of example in FIG. 2, this may also be done asymmetrically only in relation to one of the first two smoothing rolls.

Owing to these shapes of the nozzle body, it is possible to set the distance from the melt exit edge to the smoothing gap at less than 100 mm, preferably less than 80 mm and in particular embodiments less than 60 mm. Surprisingly, it has been found that a particularly good film quality, particularly in relation to the surface quality, can be achieved by particularly small distances from the melt exit edge to the smoothing gap. The distance from the melt exit edge to the smoothing gap is defined in the context of this invention as the distance (6 in FIG. 2) between the melt exit edge and the point centrally between the smoothing rolls which lies at the shortest distance (7 in FIG. 2) from the two smoothing rolls.

In particular, the present invention relates to a method in which the flat film nozzle is aligned by means of a laser in relation to the smoothing mechanism. This is used to ensure that the parallel deviation of the nozzle from the smoothing rolls, measured at the two ends of an outer side of the nozzle, has a maximum deviation of 3 mm, preferably of 1 mm. The outer sides of the nozzle are in this case the two sides of the flat film nozzle which respectively extend parallel to the two smoothing rolls.

In particular, the method is distinguished in that the difference between the thinnest and thickest points of the light guide body is at most 8 µm, preferably at most 5 µm and particularly preferably at most 4 µm. These small deviations of the film thickness have surprisingly been made possible by the method according to the invention and have particular advantages in use as a light guide body or film. Such a uniform film leads to particularly low light losses and particularly good light guiding.

In particular, the light guide bodies produced according to the invention are distinguished in that the thickness deviation in the light guide body is at most 4%, preferably at most 3%. The thickness deviation is determined on the basis of the thinnest point of the light guide body. A deviation of 3% therefore means that the thickness of the thickest point of the light guide body can be at most 3% greater than the thickness of the thinnest point.

In a way which could not be foreseen, the method according to the invention makes it possible to provide a thin light guide body with which very homogeneous lighting of relatively large surfaces can be achieved.

The light guide bodies produced by a method according to the present invention are furthermore distinguished by particularly high resistance to weathering effects, in particular UV exposure.

The light guide bodies furthermore exhibit a uniform colour quality of the output of light over the entire surface. This leads to light with particularly good colour rendering. In particular, no impression of yellowness is created even with an increasing distance from the light source. Furthermore, the brightness of the light guide body can be adapted to different requirements.

Surprisingly, a light guide body produced according to the invention makes it possible to provide a lighting unit which has high energy efficiency, high luminous intensity and high reliability.

The method according to the invention for producing light guide bodies is furthermore particularly straightforward and economical to carry out.

Detailed Configuration of the Apparatus Used According to the Invention

The extrusion of polymers to form films is widely known, and is described for example in Kunststoffextrusionstechnik II [Plastics extrusion technology II], Hanser Verlag, 1986, p. 125 ff. Other embodiments of the individual apparatus components are also mentioned here.

In the method according to the invention, a hot melt is extruded from the nozzle of the extruder onto a gap between two smoothing rolls. The optimum temperature of the melt depends for example on the composition of the mixture, and can therefore vary in wide ranges.

Preferred temperatures of the PMMA moulding compound as far as the nozzle entry lie in the range of from 150 to 300° C., particularly preferably in the range of from 180 to 270° C. and more particularly preferably in the range of from 200 to 220° C. The temperature of the smoothing rolls is preferably less than or equal to 150° C., preferably between 60° C. and 140° C.

So that the film obtained has a high surface quality, the temperature of the nozzle is preferably selected to be higher than the temperature of the mixture before the nozzle entry. The nozzle temperature is preferably set 10° C., particularly preferably 20° C. and more particularly preferably 30° C. higher than the temperature of the mixture before the nozzle entry. Accordingly, preferred nozzle temperatures lie in the range of from 160° C. to 330° C., particularly preferably from 190° C. to 300° C.

The smoothing mechanism used according to the invention consists of two or three smoothing rolls. Smoothing rolls are widely known in the technical field, polished rolls being used to obtain a high gloss. In the method according to the invention, however, rolls other than smoothing rolls may also be used. A film is formed through the gap between the first two smoothing rolls, and is converted into a solid film by the simultaneous cooling. FIG. 1 schematically shows an embodiment having three smoothing rolls.

It has surprisingly been found that a particularly good surface quality of the light guide body can be ensured when the nozzle and roll have chromium surfaces, and more particularly when these chromium surfaces have a roughness Ra (according to DIN 4768) of less than 0.10 µm, preferably less than 0.08 µm.

The pressure with which the molten mixture is pressed into the nozzle may, for example, be controlled via the speed of the screw. The pressure generally lies in a range of 40 to 150 bar, although the method according to the invention is not restricted to this. The speed with which these films can be obtained according to the invention is therefore in general greater than 5 m/min, in particular greater than 10 m/min.

In order to ensure a uniform melt feed, a melt pump may additionally be installed before the flat film nozzle.

So that the film formed is substantially free of impurities, a filter is optionally arranged before the entry of the melt into the nozzle. The mesh width of the filter is generally dictated by the starting substances used, and can therefore vary in wide ranges. Generally, it lies in the range of from 300 µm to 20 µm. Filters comprising a plurality of screens with different mesh widths may also be arranged before the nozzle entry. These filters are commercially available.

In order to obtain films with high quality, it is furthermore advantageous to use particularly pure raw materials.

Optionally, a static mixing element may furthermore be installed before the flat film nozzle. By means of this, components such as pigments, stabilizers or additives may be mixed into the polymer melt, or up to 5 wt % of a second polymer, for example in the form of a melt from a second extruder, may be mixed with the PMMA.

Polymers Used According to the Invention

The moulding compounds used to produce the methacrylate-based light guide bodies produced according to the invention are moulding compounds of which at least 80 wt %, preferably at least 90 wt % and particularly preferably at least 95 wt % consist of polymethyl methacrylate (abbreviated below to PMMA), while not containing any impact modifiers. These polymers are generally obtained by radical polymerization of mixtures which contain methyl methacrylate. In general, these mixtures contain at least 80 wt %, preferably at least 90 wt % and particularly preferably at least 95 wt % of methyl methacrylate, expressed in terms of the weight of the monomers. A particularly high quality is exhibited in particular by light guide bodies which essentially consist of polymethyl methacrylate.

These mixtures may furthermore contain other (meth) acrylates which can be copolymerized with methyl methacrylate. The expression (meth)acrylates covers methacrylates and acrylates as well as mixtures of the two.

Besides the (meth)acrylates mentioned above, the compositions to be polymerized may also comprise further unsaturated monomers which can be copolymerized with methyl methacrylate and the aforementioned (meth)acrylates. These include inter alia 1-alkenes, acrylonitrile, vinyl acetate, styrene, substituted styrenes, vinyl ethers or divinylbenzene. All the monomers mentioned are preferably used with high purity.

The weight-average molecular weight $M_w$ of the homopolymers and/or copolymers to be used according to the invention may vary in wide ranges, the molecular weight conventionally being adapted to the intended application and the method of processing the moulding compound. In general, however, it will lie in the range of between 20,000 and 1,000,000 g/mol, preferably from 50,000 to 500,000 g/mol and particularly preferably from 80,000 to 300,000 g/mol, although the method according to the invention is not intended to be restricted to this. The weight-average molecular weight is determined by means of size exclusion chromatography (SEC) against polystyrene standards.

Various poly(meth)acrylates, which differ for example in terms of molecular weight or in terms of monomer composition, may be used to produce the light guide body. Such particularly preferred moulding compounds are commercially available under the brand name PLEXIGLAS® from Evonik Röhm GmbH.

The moulding compounds may contain conventional additives. These include inter alia antistatics, antioxidants, photostabilizers and organic phosphorus compounds, weathering protectors and plasticizers. The amount of additives is, however, limited by the intended application. The light guide bodies according to the invention preferably contain at most 5 wt % and particularly preferably at most 2 wt % of additives; light guide bodies which essentially comprises no additives surprisingly exhibit extraordinary performance.

In a preferred embodiment, the light guide body is provided in the form of a multilayer laminate, preferably a two-layer laminate. One layer constitutes the aforementioned PMMA light guide body having the composition according to the invention. In this particular embodiment, the light guide body is a coextrudate having at least one PMMA layer and at least one PVDF layer. The qualitative data given above for the composition in this case relate exclusively to the PMMA layer.

The Light Guide Body

Besides the method described, the invention also relates to the light guide bodies which can be produced by the method according to the invention and to the lighting units produced using them. Such a lighting unit according to the invention comprises at least one light source and at least one light guide body. At least 80 wt %, preferably at least 90 wt % and particularly preferably at least 95 wt % of the light guide body consists of PMMA, and it does not contain any impact modifiers. Furthermore, the light guide body has a thickness of between 100 µm and 1 mm, preferably between 125 µm and 500 µm, particularly preferably in the range of from 100 µm to 300 µm. The difference between the thinnest and thickest points of the light guide body is at most 8 µm, preferably at most 5 µm and particularly preferably at most 4 µm, and the optical attenuation, measured by a method according to a measurement method mentioned below on a 0.5 mm thick film at a wavelength of 730 nm, is less than 10 000 dB/km, preferably less than 9000 dB/km and particularly preferably less than 8000 dB/km. These values can be extrapolated accordingly to other thicknesses.

The thickness refers here to the average value of the shortest extent of the light guide body as measured perpendicularly to the light propagation direction. The thickness may be determined by means of an external screw micrometer or similar known devices.

The lighting units are preferably distinguished in that the thickness deviation in the light guide body is at most 3% and the yellowness index of the light guide body (calculation according to DIN 6167; measurement according to DIN 5033) measured with $\square_{[D65/10°]}$ is less than 1, preferably less than 0.75, particularly preferably less than 0.5 and more particularly preferably less than 0.3.

The light source preferably comprises one or more light-emitting diodes (LEDs). These are particularly preferably positioned on the edge of the light guide body. In particular, the light guide bodies of the present invention have at least one light entry surface and at least one light exit surface, the light entry surfaces preferably being one or more outer edges of the light guide body. In an alternative embodiment, the light may be input over a large area via a prism.

All known light sources may be used to illuminate the light entry surface. Particular advantages can be achieved in particular by one or more light-emitting diodes. These may be arranged for example in a frame on an edge, or an edge surface or end surface, laterally with respect to the surface of the light guide body to be lit indirectly.

Depending on the arrangement of the light sources, the light may in this case be input through all four edge surfaces. This may be necessary in particular for very large light guide bodies. For smaller light guide bodies, one or two light sources are generally sufficient.

The light entry surface is capable of receiving light into the body, so that the light-guiding layer can distribute the introduced light over the entire light exit surface. The term light exit surface refers here to a surface of the light guide body which is suitable for emitting light. The output of light is preferably achieved by structuring in the surface of the light guide body. Accordingly the surface of preferred light guide bodies, formed parallel to the light exit surface, comprises a region with structures and a region without structures, via which as far as possible no light is emitted. Preferred light guide bodies can therefore emit light, which is input through the light entry surface, in a controlled way over very well-defined regions of the surface. Accordingly, the surface which is formed perpendicularly to the light propagation direction may, besides a light exit surface, also have a surface via which only a small part of the light shone in is output. A small part means that the luminance in this region of the surface is at most 20%, particularly preferably at most 10% of the maximum luminance measured on the light exit surface. Surfaces having a low luminance do not count as part of the light exit surface here.

The ratio of the light exit surface area to the light entry surface area is generally at least 1, in particular at least 4, preferably at least 20 and particularly preferably at least 80. According to a preferred embodiment of the present invention, the light exit surface is perpendicular to the light entry surface.

According to a preferred aspect of the present invention, the light guide body may have a configuration in the shape of a panel, the three dimensions of the body having a different size.

The smallest dimension is in this case the thickness of the panel. The largest dimension will be defined as length, so that the third dimension represents the width. It follows from this that the light exit surface of this embodiment is defined by a surface area which corresponds to the product of length times width. The edge surfaces of the panel, respectively defined as the surface area which is formed by the product of length times thickness or width times thickness, may generally be used as a light entry surface. Preferably, the edge surfaces used as a light entry surface are polished.

The output of the light depends on the density of the structuring of the light exit surface, or its roughness. The denser this structuring is, the greater is the probability of the output of light from the light guide.

Preferably, such a light guide body has a length in the range of from 20 to 3000 mm, preferably from 30 to 2000 mm and particularly preferably from 50 to 100 mm.

The width of this preferred embodiment generally lies in the range of from 10 to 3000 mm, preferably from 20 to 2000 mm and particularly preferably from 50 to 80 mm.

In particular, the lighting unit according to the invention is distinguished in that a part of the surface of the light guide body comprises structuring and there is a contrast between the structured surface of the light guide body and the non-structured surface of the light guide body.

The structuring may be obtained after production of the films, for example by pressure or other mechanical effects. The structuring may furthermore be achieved during production of the films, by using rolls which comprise a negative of the structuring.

With respect to this invention, the shape of the structuring is not critical. What is essential is that the light exit surface comprises defects which are capable of outputting light. For example, points or notches may be applied. Furthermore, the light exit surface may also be roughened. Conventionally, the structuring has a depth in the range of from 0.5 µm to 100 µm, in particular from 2 µm to 20 µm.

As mentioned above, the surface formed perpendicularly to the light propagation direction may also comprise regions without structures. Regions of the surface via which little output of light, preferably no output of light, is intended to take place preferably have a roughness Ra of less than 0.10 µm, preferably less than 0.08 µm.

The density of the structuring may be selected to be constant over the entire surface. Even so, a very uniform luminance is achieved by the present invention.

It is furthermore possible to increase the density of the structuring with the distance from the light source, in order to obtain a more uniform luminance. In comparison with conventional light guides, however, the density variation can be selected to be substantially less since the light guides according to the invention intrinsically have a more uniform luminance distribution.

The lighting units according to the invention may be employed in particular as a back light unit (BLU), edge lit back light unit or light guide panel (LGP).

Method for Determining the Optical Attenuation of Light Guide Films

The measurement is carried out on a Varian Cary 5000 equipped with a DRA2500 integration sphere. The measurement is carried out on film strips having a thickness of 0.5 mm, a width of 15 mm and a length of up to 970 mm.

For the measurement process, the measurement beam of the spectrophotometer is introduced into the end side of the film sample. At the opposite end of the strip, the optically attenuated light enters the integration sphere and is measured by the detector. In order to obtain a usable measurement signal, the input of light into the very small area of the sheet end side (for example a film thickness of 15 mm*0.5 mm) must be set to the most intense position of the measurement beam. This necessary arrangement of the beam path prevents a conventional baseline from being obtained. In relation to the reference beam, it is then only possible to measure relative intensities which result from the transmission through the film and the input losses. By measuring differently long film strips, with input and output losses kept constant, it is possible to compensate for these. The measurements are carried out by first measuring a long strip (970 mm), which is subsequently shortened to 530 mm and measured again. As a result, the optical attenuation is calculated as follows while taking into account the length difference and the intensities found:

$$L = \frac{10}{l} * \log^B \frac{I_0}{I} \text{ in dB/km.}$$

L: optical attenuation
l: the length difference between the short and long paths
$I_0$: the rel. intensity over the short path
I the rel. intensity over the long path.

The measurement value is determined by determination three times and calculation of the average.

REFERENCES IN THE DRAWINGS

FIG. 1: Embodiment having a three-roll smoothing mechanism and a nozzle lip adapted on one side FIG. 2: Illustration of the distances between the nozzle lip and the smoothing mechanism
(1) static mixing mechanism
(2) flat film nozzle
(3) nozzle lip (flex lip)
(4) outer geometry of the nozzle body adapted on one side
(5) smoothing mechanism consisting of three (FIG. 1) or two (FIG. 2) smoothing rolls
(6) distance between the melt exit edge and the point centrally between the smoothing rolls
(7) the shortest distance between the two smoothing rolls

The invention claimed is:

1. A method for producing a methacrylate-based light guide body having a thickness of between 100 µm and 1 mm, the method comprising extruding a methacrylate-based material in an apparatus followed by smoothing, to produce a methacrylate-based light guide body,
   wherein the apparatus comprises
     an extruder,
     an optional melt pump,
     an optional melt filter,
     an optional static mixing element,
     a flat film nozzle,
     a smoothing mechanism comprising smoothing rolls, and optionally a winder;
   the flat film nozzle comprises a nozzle lip comprising control elements for adjusting the nozzle lip width, said control elements having a mutual separation of from 11 to 15 mm, such that a nozzle body has an external geometry which is adapted to the shape of the smoothing rolls;
   a distance from a melt exit edge to a smoothing gap is 80 mm or less; and
   at least 95 wt % of the methacrylate-based light guide body consists of PMMA, and it does not contain any impact modifiers.

2. The method according to claim 1, wherein the flat film nozzle is aligned with a laser in relation to the smoothing mechanism, and a parallel deviation of the nozzle from the smoothing rolls, measured at the two ends of an outer side of the nozzle, has a maximum deviation of 3 mm.

3. The method of claim 1, wherein a difference between the thinnest and thickest points of the light guide body is at most 5 µm.

4. The method of claim 1, wherein a thickness deviation in the light guide body is at most 4%.

5. The method of claim 1, wherein the nozzle and the roll have chromium surfaces, and these chromium surfaces have a roughness Ra of less than 0.08 μm.

6. The method of claim 2, wherein a difference between the thinnest and thickest points of the light guide body is at most 5 μm.

7. The method of claim 2, wherein a thickness deviation in the light guide body is at most 4%.

8. The method of claim 1, wherein a thickness deviation in the light guide body is at most 3%.

9. The method of claim 2, wherein the nozzle and the roll have chromium surfaces, and these chromium surfaces have a roughness Ra of less than 0.08 μm.

10. The method of claim 1, wherein the nozzle body has an external geometry which is a complementary shape to the shape of the smoothing rolls.

* * * * *